3 Sheets—Sheet 1.
R. GEORGE.
APPARATUS FOR SEPARATING AND CONCENTRATING ORES.
No. 106,049.          Patented Aug. 2, 1870.
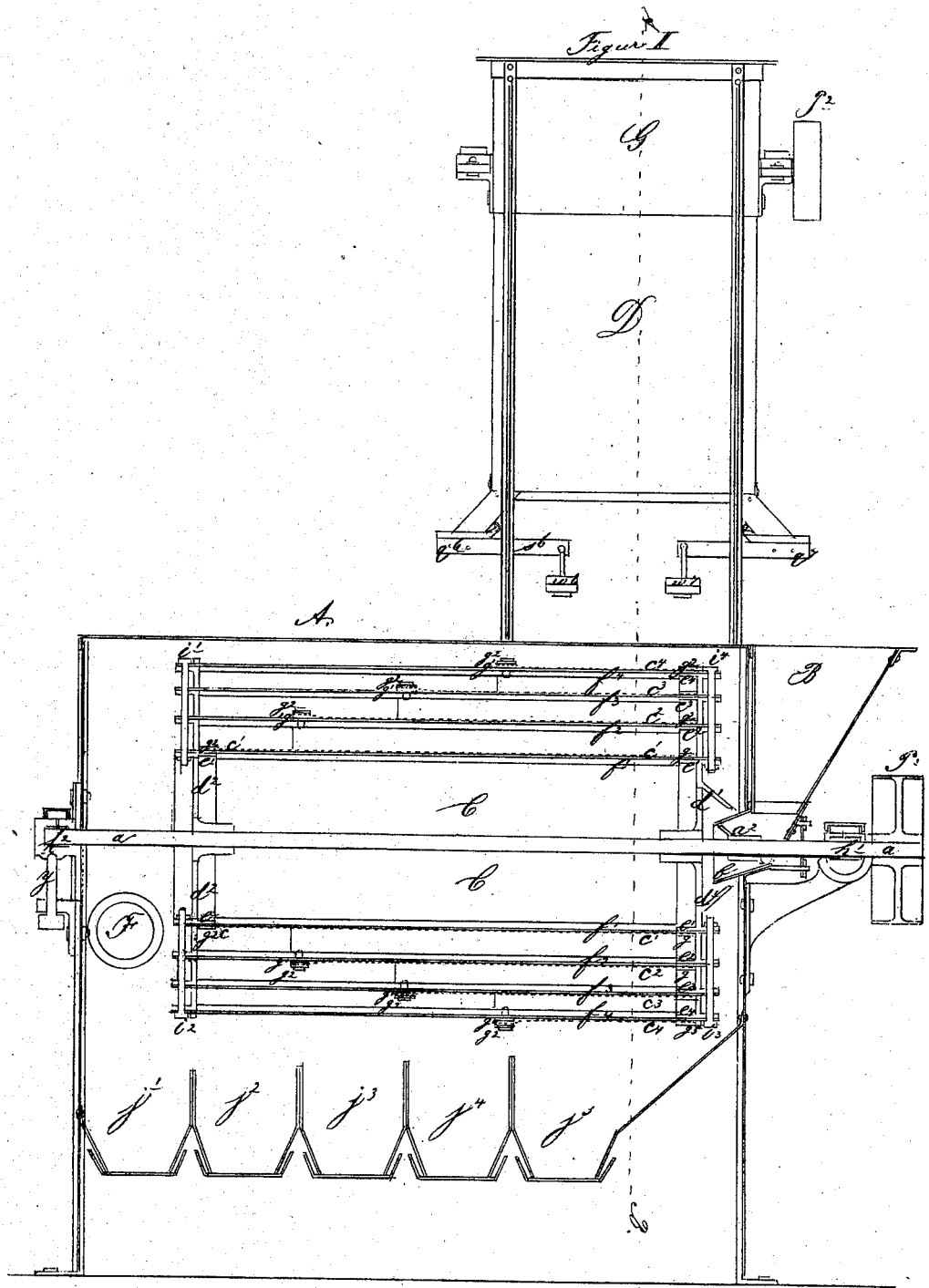

3 Sheets—Sheet 2.
R. GEORGE.
APPARATUS FOR SEPARATING AND CONCENTRATING ORES.
No. 106,049. Patented Aug. 2, 1870.
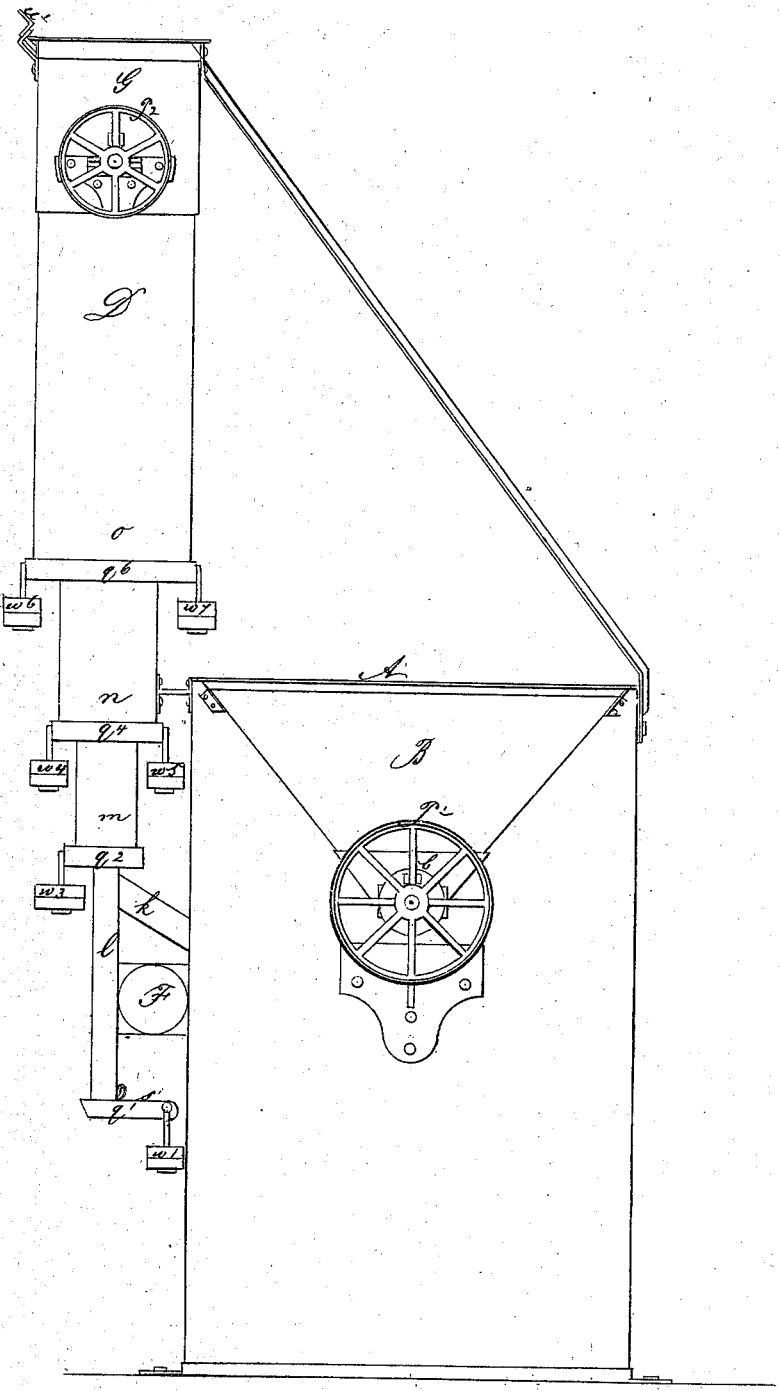
Fig. II.
Witnesses
Wm Martin
H C Johnson
Inventor
Robert George

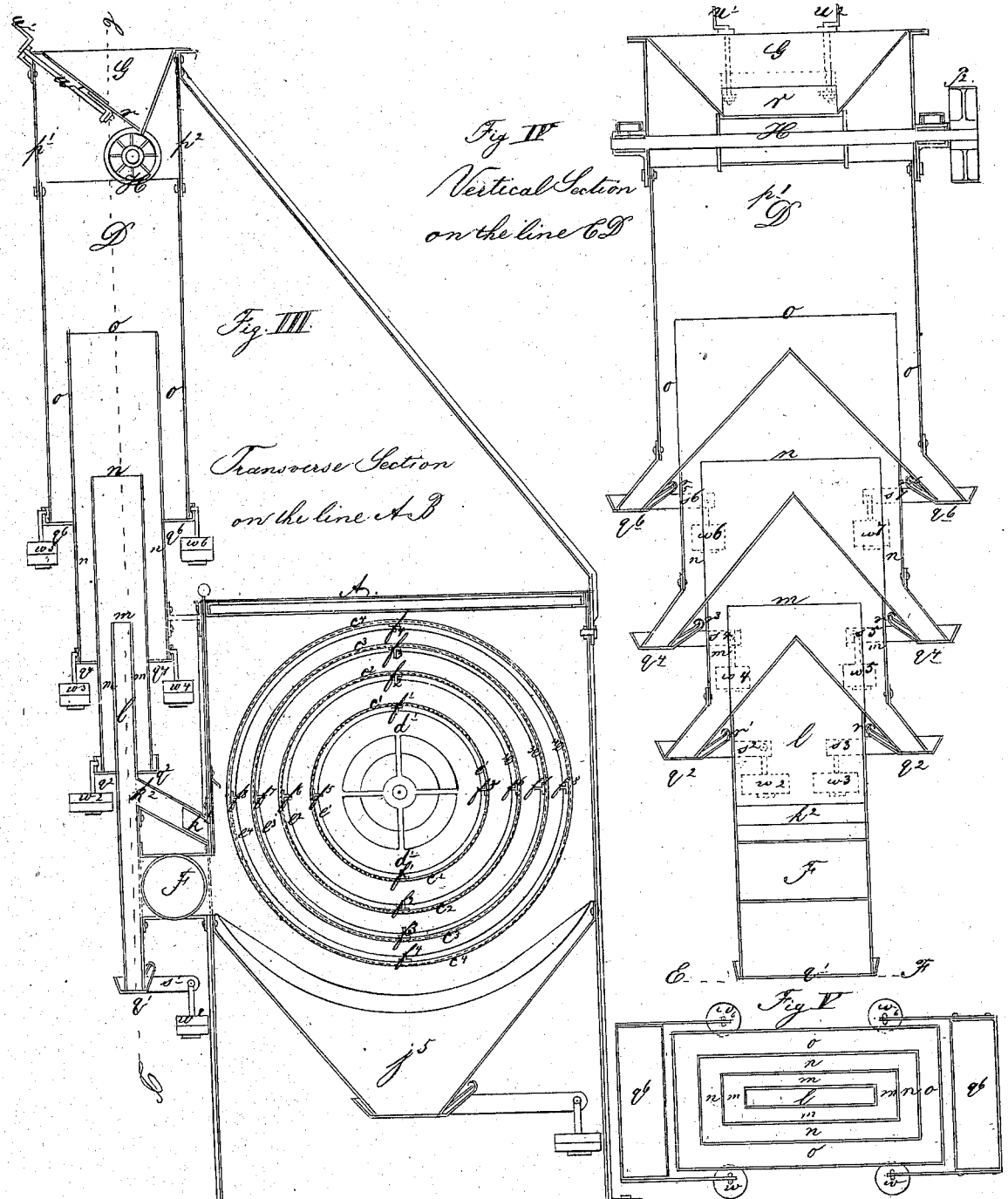

United States Patent Office.

ROBERT GEORGE, OF DENVER CITY, COLORADO TERRITORY.

Letters Patent No. 106,049, dated August 2, 1870.

IMPROVEMENT IN APPARATUS FOR SEPARATING AND CONCENTRATING ORES.

The Schedule referred to in these Letters Patent and making part of the same.

*To all whom it may concern:*

Be it known that I, ROBERT GEORGE, of Denver City, in the county of Arapahoe, in the Territory of Colorado, have invented a new and useful Machine to Sift, Assort, Separate, and Size Useful and Valuable Minerals and Fossil Substances; and I do hereby declare that the following is a full, clear, and exact description of its construction and operation, reference being had to the annexed drawings making a part of this specification, in which—

Figure I, sheet 1, is a longitudinal section and side view.

Figure II, sheet 2, is a front elevation.

Figure III, sheet 3, is a transverse section on the line A B.

Figure IV, sheet 3, is a vertical section on the line C D.

Figure V, sheet 3, is a plan on the line E F.

Similar letters, in blue ink, refer to similar parts throughout the several elevations and sections.

My machine is a combined sifter and separator, and is designed and constructed to sift, separate, and size minerals and fossil substances, in a comminuted state.

When materials are to be sifted or assorted, in order to gather and collect the particles of a uniform size, or separate them from dross, dust, or other extraneous matter, they have been heretofore charged either on plane, curved, or cylindrical sieves of wire-gauze, or perforated sheet metals, and the promiscuous mass, to be operated as above, was, in all cases, spread or charged first on the finest sieve, and the portion remaining unsifted, being the greatest bulk of the materials, was then successively run through sieves of increasing and varying coarseness, until the whole mass was sifted and assorted.

To this mode of operation is consequent the practical difficulty that thereby the finest sieves are overloaded, and subjected to the greatest weight and bulk of the materials to be sifted, and, as a consequence, they wear out very fast, especially when the materials to be sifted are of a considerable specific gravity, as, for instance, metals, and mineral substances, or when they are of a sharp-edged fracture. Furthermore, by the charging and overloading of the finest sieves first with the bulk of the materials, the separation is imperfect, as the larger particles not only settle on the surface of the sieve, and thereby prevent the finer ones from passing through, but, being also possessed of a greater cohesive power, they attract the smaller particles, and carry the same with them. Especially is this the case when the larger particles are of an amorphous, porous, or irregular form, from all of which the operation is not only rendered defective, but also impracticable. Especially is this the fact when mineral substances of great fineness are being treated.

In the construction and operation of my combined sifter and assorter, I have endeavored to remove and cure all of the above difficulties and imperfections, and thus secure a perfect operation.

To enable others skilled in the art to make and use my invention, I will proceed to describe its construction and operation.

The machine consists of three main parts, viz:

First, the square box A, with the hopper B.

Second, the cylindrical sieves C.

Third, the separator D.

The materials which it is intended to assort, sift, and size, are charged into the hopper B, through which the shaft $a$ extends longitudinally along the bottom part, which is there furnished with and encompassed by the endless screw $a^2$, whose office is to convey the materials to be sifted over the spout $b$, in regular quantities, into the cylindrical sieves C, which said cylindrical sieve C consists of the shaft $a$, the inlet-plate $d^1$, the exit-plate $d^2$, the sieves $c^1 c^2 c^3 c^4$, and the rectangular bars $f^1 f^2 f^3 f^4$, &c., and is constructed as follows:

The inlet-plate $d^1$ is an iron circular plate, provided, on the inside, (facing the sieves,) with the circular flanges $e^1 e^2 e^3 e^4$, projecting rectangularly, and, on the outside part, with a conical flange, whose base is the plate, sufficiently large to admit of the insertion of the spout $b$ from the hopper B, without friction. The exit-plate $d^2$ is the counterpart of the inlet-plate $d^1$, with the exception of the flanges, it being provided with only one corresponding flange, viz., $e^5$. Both plates have corresponding perforations, through which pass the rectangular bars $f^1 f^2$, &c. The exit-plate $d^2$ is also provided, on the outside, with an extended conical flange, through which the materials from sieve $c^1$ are discharged.

The sieves $c^1 c^2 c^3 c^4$ are cylindrical in form, and are made either of wire or perforated sheet metals, and are of different sizes and dimensions, decreasing in coarseness and size from the center, the innermost sieve being the coarsest and longest, the outermost the finest and shortest. These sieves are fastened to inlet-plate $d^1$ by slipping them over the flanges $e^1 e^2 e^3 e^4$, and are then securely fastened in position by means of hoops $g^2$ driven over the sieves, and so compressed and fastened between the hoops and flanges. In like manner sieve $c^1$ is fastened to exit-plate $d^2$. The other sieves, not extending to exit-plate $d^2$, rest on the rectangular bars $f^2 f^3$, &c., which not only act as a support, but also prevent the sieves from bending or bulging out. The unfastened edges or ends of the sieves are placed between the iron bands or hoops $g^1 g^2$, which bands or hoops are securely fastened to the rectangular bars by means of bolts, whereby the end of the sieves is securely and immovably fastened. The bars $f^1 f^2 f^3$, &c., are of iron, and are made of a rectangular shape or form, so as to provide a base or support for the sieves, which rest upon and are fastened to them, as aforesaid, and also to form a wall, to which a parallel bar is bolted, and between which the longitudinal ends of the wire or perforated metal, forming the sieve, are passed, and, by the compression, securely fastened, whereby its cylinder form is given it. These rectangular bars are deprived of an angle at their ends, forming thus a shoulder, which rests against the inlet and exit-plates $d^1 d^2$, while the other angle is passed through the perforation in said plates, as heretofore mentioned, and securely bolted by bolts $i^1 i^2$. In this manner, a solid, compact cylinder, of four sieves, or more, as necessity may require, is formed, the axis of which is the shaft $a$, which passes through the center of the inlet and exit-plates $d^1 d^2$, and is thereto securely fastened by keys or set-screws.

The shaft $a$ is supported by and rests on the journal-boxes $h^1 h^2$, and is moved by a crank or pulley, P.

Journal-box $h^2$ is attached and fastened to the outside frame-work A in a slide, which is regulated by the adjusting-screw $y$, whereby the cylinder C can be raised or lowered, so that the sieves will be either in a plane or incline, and thereby a speedy or slow discharge of the materials being sifted is secured by this process. The bulk of the materials being sifted is constantly diminishing, in a ratio proportionate to the sizes of the sieves through which it alternately passes, and, as a consequence, overloading of the finer sieves cannot take place, and thus the usual wear and tear of the same are prevented and obviated, especially as now the materials may be selected for the construction of the sieves in proportion to the work required, and the bulk and weight of materials to which they will be subjected.

Where the materials to be sifted are in a very comminuted or pulverized state, the dust thereof will inevitably mix in with the assorted mass. As this may be objectionable, especially when it is necessary to have the assorted particles of a uniform clean grain, I overcome and prevent this by introducing a blast of air into the box A, containing the cylindrical sieve C, by means of the pipe F, which, connected with a blowing-machine, the current of air introduced, as above, prevents the settling of the dust on the box A, but forces it out, through the slot $k^1$, either into a chimney, or into the dusting separator D, if attached, which last-mentioned machine consists of a series of four rectangular chambers, of successive and increasing dimensions, the smallest of which is partially inserted into the next largest, and are both fastened together laterally by means of iron strips placed in an equilateral triangular manner, the base of which terminates in the buckets marked $q^1 q^2$, &c., and which also form the shafts $m$ $n$ $o$. To these is fastened the next largest chamber, and then the largest chamber, in like manner. The largest chamber is furnished on the top with a cap, which has two apertures in the sides, for the egress of the dust, air, &c.

This cap is furnished on the top with a hopper, G, into which the materials are placed, and from which they pass through an interstice governed by a damper, and pass onto a corrugated roller, H, from thence to be emptied down through the chambers above mentioned.

The construction of this apparatus is based upon the principle that air, steam, water, or any fluid, when forced through a pipe, will exert a power of pressure in a ratio equal to the velocity of its force. This power of pressure will be exerted on all bodies that obstruct or impede its passage or exit.

When the obstructing or impeding bodies consist of particles in an undetached or loose state, the same will be forced along by this pressure until their resistance, being their weight, overcomes the same. This pressure is diminished and lessened in proportion to the increasing width of the pipe, until wholly lost in the counteracting atmospheric pressure, or until its force and power are expended.

A great many ores, especially silver, are deposited in the cavities of the quartz rocks in a state of pulverization equal to that of ocher, or in such minute particles, and when these rocks are crushed these ores are to be found only in a finely pulverized state, which is also the case with argentiferous, galena, and other ores, when crushed with the accompanying quartz rocks. Therefore it is that, even by the best European methods for dressing and separating the variable ores, more than twenty-five per cent. is wasted and carried off with the refuse of rocky matters, as dust. If this dust containing these valuable metals is forced into the apparatus D by a strong current of air through the slot $k^2$ as aforesaid, those particles whose specific gravity is not sufficient to overcome the pressure of this current of air will be raised to the top of the pipe $l$, into the chamber $m$, whereas the heavier particles will have fallen down into the bucket $q^1$.

As chamber $m$ is considerably wider than $l$, the pressure of the current is a lessened accordingly, and therefore the next heavier particles drop into the shafts $m$ and into bucket $q^2$. The balance will be forced up chamber $m$ into chamber $n$, which, being still larger, the pressure is still less proportionately. Consequently, the next heavier particles fall into shafts $n$, and from thence into buckets $q^3$ and $q^4$. The rest is forced up through chamber $n$ into chamber $o$, whose dimensions are still greater, and wherein the pressure exerted is still less; and the next heavier particles are deposited in shafts $o$, through which they fall into the buckets $q^5$ and $q^6$. The remainder is forced up through chamber $o$, and out of the apertures $p^1 p^2$ with the escaping current, and lost in the atmosphere as dross.

The buckets $q^1 q^2 q^3 q^4$ are secured at the bottom of the shafts $l$, $m$, $n$, and $o$ in a balancing manner, hanging suspended from the rear side of the same on pivots $r^1$, $r^2$, $r^3$, &c.

To these buckets is attached, lengthwise, a lever, $s^1$, $s^2$, &c., in a rectangular manner. As these buckets are evenly balanced, it is evident that, as soon as any materials whatsoever fall into them, they will open and discharge the same. To keep them shut, the weight $w$ is attached to the long arm of the lever, whereby they are prevented from opening until such a certain quantity of materials shall have accumulated, whose weight is sufficient to overcome and raise this weight so attached, upon which the bucket will open and empty its contents, or so much thereof as is necessary to restore the equipoise, when the weight immediately closes it again.

The bottom of the sifting-box A terminates in a trough extending throughout its entire length, which is divided into various compartments, forming the respective chambers $j^1 j^2 j^3 j^4 j^5$, the bottoms of which are movable and detached, and are secured and operate in a like manner as the buckets $q^1$, &c. By this contrivance the filling up of the same is prevented, at the same time there is always such an amount of material retained as is sufficient to render them air or water-tight.

When mineral substances are in a very comminuted state, it is in most cases very difficult to size and assort them by sifting, as the required minuteness of the meshes of the seive renders them very easily clogged and unendurable, inasmuch as the fineness of wire-gauze necessary for their construction is easily corroded. Therefore, in these cases, the materials to be assorted should be first treated in apparatus D, which is done in the following manner:

The comminuted particles are charged into the hopper G, the bottom of which is governed by the damper $r$, which is regulated by the screws $w^1 w^2$, and by means of which the aperture is widened or narrowed in so far as is necessary to insure a sufficient discharge of materials therethrough to fill the corrugations of the roller H, or such quantities as may be required for successful operation.

The roller H discharges its contents in such a manner that the same fall in a direction perpendicular with the center of the chamber $l$, the air, or whatever agent is made use of, being introduced into the apparatus D through the pipe $k^2$, being forced upward, comes into contact with the falling particles, and those particles whose weight is sufficient to overcome the pressure of this current continue in their descent and fall into bucket $q^1$; whereas, the next heavier particles will be separated from the mass and forced into chamber $m$, from thence into shafts $m$, where they drop into bucket $q^2$; while the next heavier ones, find their way into shafts $n$, and the next into shafts $o$, while the lightest particles are forced out through the apertures $p^1 p^2$, in the manner already fully described and set forth.

It is apparent, from the foregoing operation, that particles are separated according to their weight, and, as a consequence, the assorted particles, though of a uniform weight, will vary and differ in their dimensions and size. To instance, if the current of air in the chamber $l$ has a pressure sufficient to carry with it particles weighing one grain, particles of this specific gravity would be deposited in buckets $q^2$, for the reason that the increased dimensions of the chamber $m$ would lessen the pressure in a proportionate degree, and therefore would be insufficient to force the particles of one grain weight any higher.

Now, if the particles deposited in bucket $q^2$ consist of quartz rock, whose specific gravity is about 2.6, and iron pyrites, whose specific gravity is about 5, the particles of quartz will be about double the size of the iron pyrites, though both particles weigh one grain.

Thus it will be seen that, by the use of my combined sifter and assorter, a separation of minerals and fossil substances, according to their nature or quality, as, for instance, quartz from iron pyrites, galena, copper, &c., different in their specific gravity, can be had without the aid or application of any other machinery.

The degree of pressure exercised by the introduced current of air, or whatever agent is made use of, can be ascertained and measured by the manometer, or by a water-gauge attached to the several chambers.

What I claim as my invention and desire to secure by Letters patent, is—

1. The process of assorting minerals or fossil substances of different specific gravity, according to their nature or quality, by means of a pressure brought to bear on them by forcing a current of air through a pipe, tube, or series of chambers, into which the particles to be assorted are dropped.

2. The process of separating mineral or fossil substances, and assorting them according to their weight, and then size them, or to size them first, and then assort them according to their weight, substantially in the manner described.

3. A combined sifter and assorter, constructed and operated in the manner hereinbefore set forth.

4. The cylindrical sieve C, consisting of a series of four or more cylindrical seives, the one encompassing the other, and graded, so that the coarsest and longest sieve will be the center or inside one, and the shortest and finest the outside one, together with the manner of constructing inlet-plate $d^1$ and exit plate $d^2$ and their appendages; also the rectangular bars $f^1, f^2$, &c., with their manner of fastening; also, the mode of fastening and securing sieves $c^1 c^2 c^3 c^4$ to inlet-plate $d^1$, to exit-plate $d^2$, and to the rectangular bars $f^1, f^2$, &c.

5. The manner of putting the cylindrical sieve C together and fastening it to shaft $a$.

6. The construction of the box A, with its trough divided into the compartments $j^1 j^2 j^3 j^4 j^5$, together with their movable and detached bottoms $n$, constructed and operating in manner described and set forth, together with the hopper B, its method of operation and manner of attachment and construction, and also the mode of attaching journal-box $h^2$, so as to allow it to slide, thereby regulating the cylindrical sieve C, and placing it either on a plane or incline, and also the slot $k$.

7. The process of introducing a current of air, water, or any other fluid into the box A, and forcing the same through the sieves $c^1$, &c., thereby separating and carrying off the dust from the sifted materials, and forcing the same through the slot $k^1$ into the dust-separator D.

8. The construction of the dust-separator D, as explained and set forth, consisting of a series of four or more chambers of increasing dimensions, and fastened together by inserting the end of one into the other, and fastening them laterally together by strips placed to form an equilateral triangle, and opening into the buckets $q^1 q^2 q^3 q^4$, also, for the manner of constructing and operating the said buckets $q^1$, &c.

9. The manner of constructing the cap covering the largest chamber, so as to form the aperture $p^1 p^2$, the hopper H, and providing the same with the damper $r$, regulated by the screws $U^1 U^2$, and for the corrugated roller B, its manner of attachment and mode of operation.

10. The process of operating the separator D, that is, charging the ore in regulated quantity from above to meet a current of air from below.

In testimony whereof I have hereunto set my hand this 11th day of July, A. D. 1870.

ROBERT GEORGE.

Witnesses:
E. P. WEBER,
LOUIS SCHULZE.